US010782161B2

(12) United States Patent
Silverman et al.

(10) Patent No.: US 10,782,161 B2
(45) Date of Patent: Sep. 22, 2020

(54) ULTRASONIC TRANSDUCER MOUNTING APPARATUS FOR ATTACHING A TRANSDUCER BLOCK TO A PIPELINE

(71) Applicant: BERKELEY SPRINGS INSTRUMENTS LLC, Cumberland, MD (US)

(72) Inventors: Eugene B. Silverman, Cumberland, MD (US); Nischom K. Silverman, Albuquerque, NM (US)

(73) Assignee: BERKELEY SPRINGS INSTRUMENTS, LLC, Cumberland, MD (US)

( * ) Notice: Subject to any disclaimer, the term of this patent is extended or adjusted under 35 U.S.C. 154(b) by 27 days.

(21) Appl. No.: 15/185,635

(22) Filed: Jun. 17, 2016

(65) Prior Publication Data
US 2016/0370212 A1 Dec. 22, 2016

Related U.S. Application Data

(60) Provisional application No. 62/181,045, filed on Jun. 17, 2015.

(51) Int. Cl.
*G01D 11/30* (2006.01)
*G01N 29/28* (2006.01)
*G01N 29/22* (2006.01)

(52) U.S. Cl.
CPC ........... *G01D 11/30* (2013.01); *G01N 29/223* (2013.01); *G01N 29/28* (2013.01); *G01N 2291/2634* (2013.01)

(58) Field of Classification Search
CPC ...... G01D 11/30; G01D 11/24; G01D 11/245; G01D 11/02; G01R 1/10; G01R 1/04;
(Continued)

(56) References Cited

U.S. PATENT DOCUMENTS 3,763,694 A * 10/1973 Rathburn ............... G01N 29/28
73/644
3,950,059 A * 4/1976 Anhalt ................ H01R 13/193
439/261
(Continued)

FOREIGN PATENT DOCUMENTS

CN 201104256 Y 8/2008
WO WO 90/14576 A1 11/1990
WO WO 2015/042698 A1 4/2015

OTHER PUBLICATIONS

Extended European Search Report of EP 16812513.6 dated Mar. 27, 2019.

*Primary Examiner* — Tran M. Tran
(74) *Attorney, Agent, or Firm* — Birch, Stewart, Kolasch & Birch, LLP

(57) ABSTRACT

A transducer mounting apparatus can be used to remotely monitor the integrity of pipes or pipelines, which ordinarily are difficult to access due to environmental factors. The transducer mounting apparatus can include one or more transducer blocks, each adapted for receiving a transducer. A UT couplant and threaded transducer are positioned in an opening in the transducer block. A gear wheel adjusts the transducer up and down against the UT couplant to optimize the positioning relative to the pipe being monitored. A series of transducer blocks are connected by a tension block and or more wire ropes extending through the tension block and the transducer blocks. The length of the wire rope is adjusted with a set screw extending from the tension block to a transducer block, thereby allowing the transducer block assembly to accommodate different pipe diameters or mechanical structures of varying dimensions that are not necessarily round.

11 Claims, 3 Drawing Sheets

(58) Field of Classification Search
CPC ...... G01N 29/22; G01N 29/24; G01N 29/265; G01N 29/27; G01N 29/275; G01N 29/28; G01J 5/04; G01K 1/14; G01K 11/004; G01L 19/14; G01P 1/02
See application file for complete search history.

(56) References Cited

U.S. PATENT DOCUMENTS

| | | | | |
|---|---|---|---|---|
| 3,955,425 | A * | 5/1976 | Corneau | B29C 47/92 73/622 |
| 4,019,373 | A * | 4/1977 | Freeman | G01F 1/662 73/597 |
| 4,203,324 | A * | 5/1980 | Baumoel | G01F 23/2961 367/908 |
| 4,286,470 | A * | 9/1981 | Lynnworth | G01F 1/662 73/637 |
| 4,328,708 | A * | 5/1982 | Bagwell | G01N 29/26 73/622 |
| 4,374,477 | A * | 2/1983 | Kikuchi | G01F 1/667 310/346 |
| 4,472,975 | A | 9/1984 | Beck et al. | |
| 4,632,352 | A * | 12/1986 | Stoll | G01D 11/30 248/313 |
| 4,740,146 | A * | 4/1988 | Angelbeck | B29C 47/0023 264/40.7 |
| 5,007,291 | A * | 4/1991 | Walters | G01N 29/043 226/176 |
| 5,058,439 | A * | 10/1991 | Carpenter | B25B 23/14 73/581 |
| 5,413,502 | A * | 5/1995 | Wang | H01R 24/46 439/314 |
| 5,537,853 | A * | 7/1996 | Finburgh | A61M 5/365 73/19.03 |
| 5,576,492 | A * | 11/1996 | Phalin | G01N 29/225 73/618 |
| 5,703,277 | A * | 12/1997 | Grabovac | G01L 25/003 73/1.09 |
| 5,729,508 | A * | 3/1998 | Baker | H04R 21/028 310/327 |
| 5,948,985 | A * | 9/1999 | Brautigan | G01N 29/223 73/622 |
| 5,992,236 | A * | 11/1999 | White | G01N 29/043 73/622 |
| 6,011,391 | A * | 1/2000 | Nix | G01B 7/105 324/230 |
| 6,015,251 | A * | 1/2000 | Chung | F16B 39/32 411/252 |
| 6,053,031 | A * | 4/2000 | Kullik | G01N 33/0073 73/23.2 |
| 6,273,373 | B1 * | 8/2001 | Baumoel | G01B 5/0002 248/73 |
| 6,343,512 | B1 * | 2/2002 | Bourne | G01N 29/2456 600/459 |
| 6,412,344 | B1 | 7/2002 | Danicich et al. | |
| 6,432,057 | B1 * | 8/2002 | Mazess | A61B 8/0875 600/449 |
| 6,553,336 | B1 | 4/2003 | Johnson et al. | |
| 6,599,049 | B2 * | 7/2003 | Erben | B60K 35/00 116/62.1 |
| 6,917,176 | B2 * | 7/2005 | Schempf | G01M 3/005 318/568.11 |
| 7,051,607 | B2 * | 5/2006 | Wekluk | F16M 11/046 73/866.5 |
| 7,100,462 | B2 * | 9/2006 | Gronvall | G01D 11/245 73/866.5 |
| 7,467,758 | B2 * | 12/2008 | Brum | B65H 75/48 242/397.3 |
| 7,467,927 | B2 * | 12/2008 | Wood | F04B 9/02 417/44.1 |
| 7,621,747 | B1 * | 11/2009 | Burrow | F41A 33/02 434/19 |
| 7,669,483 | B1 | 3/2010 | Feller | |
| 7,694,569 | B2 * | 4/2010 | McGrath | G01N 29/225 73/641 |
| 7,730,798 | B2 * | 6/2010 | Linden | G01D 11/30 73/866.5 |
| 7,770,858 | B2 * | 8/2010 | Fehrenbach | F16M 11/10 248/284.1 |
| 7,804,970 | B2 * | 9/2010 | Hippe | B06B 1/0622 310/334 |
| 7,900,346 | B2 * | 3/2011 | Fogarty | G01D 11/245 248/73 |
| 7,998,078 | B2 * | 8/2011 | Kim | A61B 8/08 600/407 |
| 8,037,768 | B2 * | 10/2011 | Ichiryu | F01D 5/10 73/660 |
| 8,042,402 | B2 * | 10/2011 | Brown | G01L 19/0015 73/756 |
| 8,120,352 | B2 * | 2/2012 | Schleyer | G01P 1/00 324/160 |
| 8,151,651 | B1 * | 4/2012 | Feller | G01F 1/662 73/861.27 |
| 8,185,327 | B2 * | 5/2012 | Fogarty | G01M 5/0016 702/33 |
| 8,240,624 | B2 * | 8/2012 | Terasaki | G01D 11/245 248/230.8 |
| 8,245,576 | B2 * | 8/2012 | Komninos | G01N 29/14 73/587 |
| 8,250,937 | B2 * | 8/2012 | Wynn | C12M 23/40 422/500 |
| 8,267,241 | B2 * | 9/2012 | den Boer | A22C 21/0007 198/679 |
| 8,365,601 | B2 * | 2/2013 | Minachi | G01B 17/02 73/602 |
| 8,438,936 | B2 * | 5/2013 | Feldman | G01F 1/662 73/861.27 |
| 8,521,453 | B1 * | 8/2013 | Silverman | G01N 29/043 702/171 |
| 8,683,882 | B2 * | 4/2014 | Jackson | G01N 29/24 73/633 |
| 8,832,956 | B2 * | 9/2014 | Shen | G01D 11/30 33/613 |
| 8,884,222 | B2 * | 11/2014 | Rychen | G01Q 70/02 250/306 |
| 8,950,282 | B2 * | 2/2015 | Babinski | B23P 15/00 74/424.82 |
| 9,033,087 | B2 * | 5/2015 | Lama | G01N 29/225 180/167 |
| 9,121,817 | B1 * | 9/2015 | Roach | G01N 29/28 |
| 9,216,109 | B2 * | 12/2015 | Badawi | A61F 9/0017 |
| 9,374,024 | B2 * | 6/2016 | Nguyen | H02N 11/006 |
| 9,429,546 | B2 * | 8/2016 | Williams | G01N 29/24 |
| 9,459,237 | B2 * | 10/2016 | McGushion | G01N 29/275 |
| 9,481,026 | B2 * | 11/2016 | Ciocirlan | B21J 13/085 |
| 9,505,031 | B2 * | 11/2016 | Wilt | B06B 1/06 |
| 9,513,146 | B2 * | 12/2016 | Leidner | G01D 11/30 |
| 9,643,313 | B2 * | 5/2017 | Hafenrichter | B25J 9/02 |
| 9,784,350 | B2 * | 10/2017 | Heck | F16H 25/2418 |
| 9,874,464 | B2 * | 1/2018 | Sedory | G01D 11/245 |
| 10,107,786 | B2 * | 10/2018 | Fan | G01F 1/662 |
| 10,161,916 | B2 * | 12/2018 | Kojima | G10K 11/28 |
| 10,345,271 | B2 * | 7/2019 | Grosser | G01N 29/28 |
| 2003/0148859 | A1 | 8/2003 | Chun | |
| 2004/0001765 | A1 | 1/2004 | Wood | |
| 2005/0137048 | A1 * | 6/2005 | Crepas | B25B 27/0035 475/230 |
| 2007/0093715 | A1 | 4/2007 | Hippe et al. | |
| 2007/0144263 | A1 * | 6/2007 | Fei | G01N 29/223 73/644 |
| 2008/0033295 | A1 * | 2/2008 | Matsumura | A61B 5/6843 600/438 |
| 2008/0307637 | A1 | 12/2008 | Fogarty et al. | |
| 2012/0167688 | A1 | 7/2012 | Minachi et al. | |
| 2012/0186941 | A1 | 7/2012 | Den Boer et al. | |
| 2014/0208876 | A1 * | 7/2014 | Mattingly | G01D 11/30 73/866.5 |
| 2016/0237759 | A1 * | 8/2016 | Li-Leger | E21B 47/01 |

* cited by examiner

ULTRASONIC TRANSDUCER MOUNTING APPARATUS FOR ATTACHING A TRANSDUCER BLOCK TO A PIPELINE

CROSS REFERENCE TO RELATED APPLICATIONS

This application claims the benefit of U.S. provisional application No. 62/181,045, filed Jun. 17, 2015, the contents of which are incorporated herein by reference.

FIELD OF INVENTION

This application is directed generally to transducers for monitoring the integrity of pipelines. More particularly, the application is directed to a transducer mounting apparatus and a method for monitoring remotely the integrity of a pipeline or other mechanical structure the integrity of which must be monitored.

BACKGROUND

Transmission pipelines for gas and oil are an important part of national energy-transportation infrastructure vital to the national economy. Because these pipelines are operated at high pressure, pipeline failure can cause severe damage to human health and property and interruption of gas or oil supplies. For example, a spill of about 267,000 gallons (1 million liters) of oil in the tundra of Alaska's North Slope went undetected for five days before a field worker smelled the crude oil while driving through the area. The spill was caused by a quarter-inch hole corroded in a pipeline. British Petroleum (BP) subsequently announced that it had to close a portion of the distribution network in Alaska because of extensive corrosion of the pipe walls. This example illustrates the magnitude of the problems associated with an aging and fast decaying pipeline system infrastructure.

In general, pipeline defects can occur in the manufacture, construction, and operation processes. The leading cause of pipeline incidents is damage by digging near existing pipelines. According to the statistics by the U.S. Department of Transportation's Office of Pipeline Safety, excavation damage accounted for almost 60 percent of all reported distribution pipeline incidents between 1995 and 2004. Corrosion sometimes results from excavation damage, which, while not severe enough to trigger a puncture or failure of the pipeline, could create weaknesses in the pipeline. Such a weakness later renders the pipeline more susceptible to corrosion. Most pipelines have protective coatings and cathodic protection systems that limit the potential for external corrosion. Despite these protective systems, internal and external corrosion and stress corrosion cracking occur in the pipelines due to aging. To ensure the continued safe operation of the transmission pipelines, continuous monitoring or periodic assessment of the integrity of the pipelines is necessary. In pipeline monitoring and inspection, the ultimate objective is to identify the locations that have defects, and to obtain an accurate measurement and assessment of the defects so that human operators can take appropriate actions to prevent further damage. Pipeline monitoring is difficult, however, in no small part because of the remote locations and severe weather conditions of the pipeline locations.

Corrosion measurement techniques commonly found in the industry include eddy current instruments, guided wave ultrasound, phased array ultrasound and direct ultrasound thickness measurements, to name a few. The use of ultrasound can be conveniently categorized as an ultrasound testing (UT) method. In the case of pipeline corrosion monitoring there are typically three measurement techniques: (1) In-Line Inspection (ILI), (2) intrusive and (3) non-intrusive techniques.

In-Line Inspection (ILI) tools, or smart pigs, are intelligent sensing devices that are introduced into the line at a specialized entry point and most commonly conveyed by product flow along the length of the pipe. Although there are significant advantages to pipeline pigging, there are a number of operational complexities and limitations. In addition, this process is expensive and invasive to a pipeline's operation.

Intrusive methods include electrical resistance probes and coupons. The coupon is the original form of intrusive corrosion monitoring. It can typically consist of a strip of metal made of material similar to the pipeline. It is weighed, then inserted into an access point and left for several months for exposure to the product being conveyed. The operator then removes the coupon and weighs it again to see what percentage is missing. As in any invasive technique, this approach to corrosion monitoring can be disruptive to pipeline operations.

The most common non-intrusive device is external monitoring such as eddy current testing and ultrasonic testing (UT) as cited earlier. In either case, in order to conduct a survey, a defined area is excavated around the pipeline and a portable device (UT flaw detector) is held against the pipe. Within the UT sensor, voltage is applied across a piezoelectric crystal to generate an ultrasonic sound wave that propagates through the metal. The time it takes to travel through the metal and back to the transducer is directly proportional to its thickness. The devices are quick, easy to use and inexpensive, and operators do not have to shut off flow or risk breeching the pipeline in order to take a reading. On the other hand, there are significant costs for digging up the pipeline each time a test is conducted. These labor costs are also high when the pipeline owner must dispatch inspectors to evaluate fixed locations on above ground pipelines, pipeline transitions and pipeline components. This is also the case for offshore pipeline structural components that are monitored on a routine basis both above and below the structure's waterline.

There are a number of other corrosion monitoring techniques available to the industry. Most, if not all, remote monitoring techniques use indirect measurement methods such as electrochemical potentials.

The problems with most present measurement techniques include:

1. The before mentioned measurement techniques require personnel to travel to asset location in order to take the measurement. Wireless networks exist for remote monitoring of flow, pressure, fugitive emissions and similar applications; however, most non-destructive measurements typically require the intervention of personnel in order to acquire the measurements;

2. Measurement tools typically require a power source that must be either available locally or accompanied with the person taking the measurement;

3. The location of many of these before-mentioned assets is difficult to access which poses safety risks to the inspectors;

4. Most permanent installations of remote measurement sensors are invasive and require some degree of operational downtime;

5. The environment in which measurements are taken can be potentially explosive; therefore, not all measurement techniques are possible without special intrinsically-safe equipment; and, 6. Mechanical degradation rates of some assets can be rapid, requiring frequent integrity assessment measurements, further increasing the personnel safety risk and operational cost.

What is needed is an improved pipeline monitoring system that does not require an operator to physically be present to activate or use the monitoring system.

SUMMARY

The present invention solves the foregoing problems by providing a transducer mounting apparatus that is adjustable to accommodate the size of a pipe, pipeline or other mechanical structure being monitored. The transducer mounting apparatus includes a transducer mounting block having a gear wheel for adjusting a transducer up and down against a UT couplant for optimizing the UT couplant/transducer positioning relative to the pipe or pipeline being monitored.

One aspect of the invention is an apparatus including a transducer block having a top surface and a bottom surface, wherein the top surface has an opening adapted for receiving a transducer; an ultrasonic testing (UT) couplant positioned in the opening in the transducer block; a transducer positioned against the UT couplant in the opening in the transducer block; and a gear wheel secured in a slot in the transducer block, wherein the gear wheel adjusts transducer pressure against the UT couplant.

A second aspect of the invention is a transducer block including a generally rectangular body having a top surface and a bottom surface, wherein the top surface has an opening adapted for receiving a transducer; and a gear wheel secured in a slot in the body, wherein the gear wheel adjusts transducer pressure against a UT couplant detachably positioned in the opening.

A third aspect of the invention is a transducer mounting apparatus including one or more transducer blocks, each adapted for receiving a transducer; a gear wheel positioned in each transducer block for adjusting pressure of a transducer against a couplant; and a tension block connected to the transducer block by one or more wire ropes for securing the transducer block to a pipeline to be monitored.

A feature of the invention is that it can use traditional high resolution ultrasound compression waves although the application can be applied to alternative non-destructive techniques such as shear waves, phased arrays, guided wave ultrasound, eddy current and electromagnetic acoustic transducers.

Another feature of the invention is that single or multiple transducers can be pulsed in any order of interest to the user and, as an alternative feature, would provide for a configuration of a multitude of sensors that can be arranged in an array.

Another feature of the invention is that an array of transducers can be arranged in the shape of a circle, oval, square or rectangular matrix or along one or more axes for a length or shape determined by the monitoring area of interest.

An advantage of the invention is that the system employs low power ultrasonic electronics, thereby making the system intrinsically safe (IS). "Intrinsically safe" equipment is defined as "equipment and wiring which is incapable of releasing sufficient electrical or thermal energy under normal or abnormal conditions to cause ignition of a specific hazardous atmospheric mixture in its most easily ignited concentration."

Another advantage of the invention is that sensors can be located in remote locations with or without a local source of power, and sensors can be located in air or submerged in a liquid such as an aboveground or belowground storage tank, or under water such as an off-shore platform.

A feature of the invention is that it provides thickness measurements with resolution capabilities equal to traditional ultrasound compression waves or similar to phased array or guided wave ultrasound. The sensors can provide measurements on structures with or without coatings, and the sensors can be attached to a structure with the use of glues, clamps, weldments or other forms of permanent or removable attachment methods.

Another feature of the invention is that it provides for the ability to integrate a wide range of sensors that would benefit the user when located in remote monitoring locations. These sensors may include seismic monitoring, monitoring of volatile organic compounds in the atmosphere or local environment, moisture, temperature, nitrogen oxides, carbon dioxide, carbon monoxide, accelerometers used to measure natural or man-made vibrations, and similar sensors used for the remote monitoring of naturally occurring or manmade events.

An advantage of the invention is that it can be monitored remotely via a wireless network accessible through the World Wide Web or in an alternative configuration accessible within a local wireless network, cellular network or local area network. The system allows the user who is logged onto the system to remotely pulse or energize the transducer.

Another advantage of the invention is that it can be packaged for use in non-explosive atmospheres and in locations requiring electronics designed for operation in explosive atmospheres.

Another advantage of the invention is that real time monitoring and control capability is possible from a remote location, either above or below ground; data can be integrated directly into mechanical integrity database management programs for real time or offline analysis; data trending with failure prediction information is readily accessible to the user; and, the system provides early failure warning based on a material loss threshold or, in an alternative configuration, thresholds of special interest to the user.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
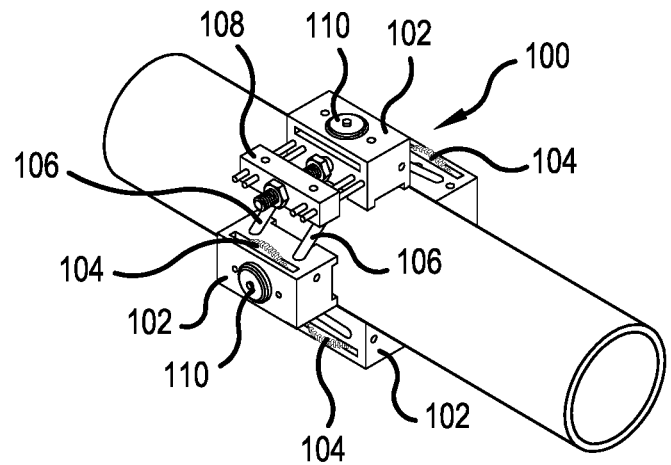
FIG. 1 is an isometric view of a transducer mounting apparatus secured to a pipe.

A transducer mounting apparatus ("apparatus") 100 of the present invention is shown generally in FIG. 1. The apparatus 100 includes one or more transducer blocks 102 adapted for receiving a transducer 110. A gear wheel 104 can be positioned in the transducer block 102 for adjusting the pressure of a transducer 110 in the transducer block 102 against an ultrasonic testing (UT) couplant 250, which also is positioned in the transducer block 102. A wire rope 106 or cable optionally but preferably can be used to connect one transducer block 102 to another transducer block 102 to form a transducer mounting apparatus 100, which can be mounted to a pipe or other structure to be monitored, regardless of the size or shape of the structure. A tension block 108 can be positioned adjacent to a transducer block 102 for adjusting the length of the wire rope 106, and thereby adjusting the size of the transducer mounting apparatus 100 depending on the size of the pipe or other structure to which the apparatus 100 is to be mounted.

Figure 2:
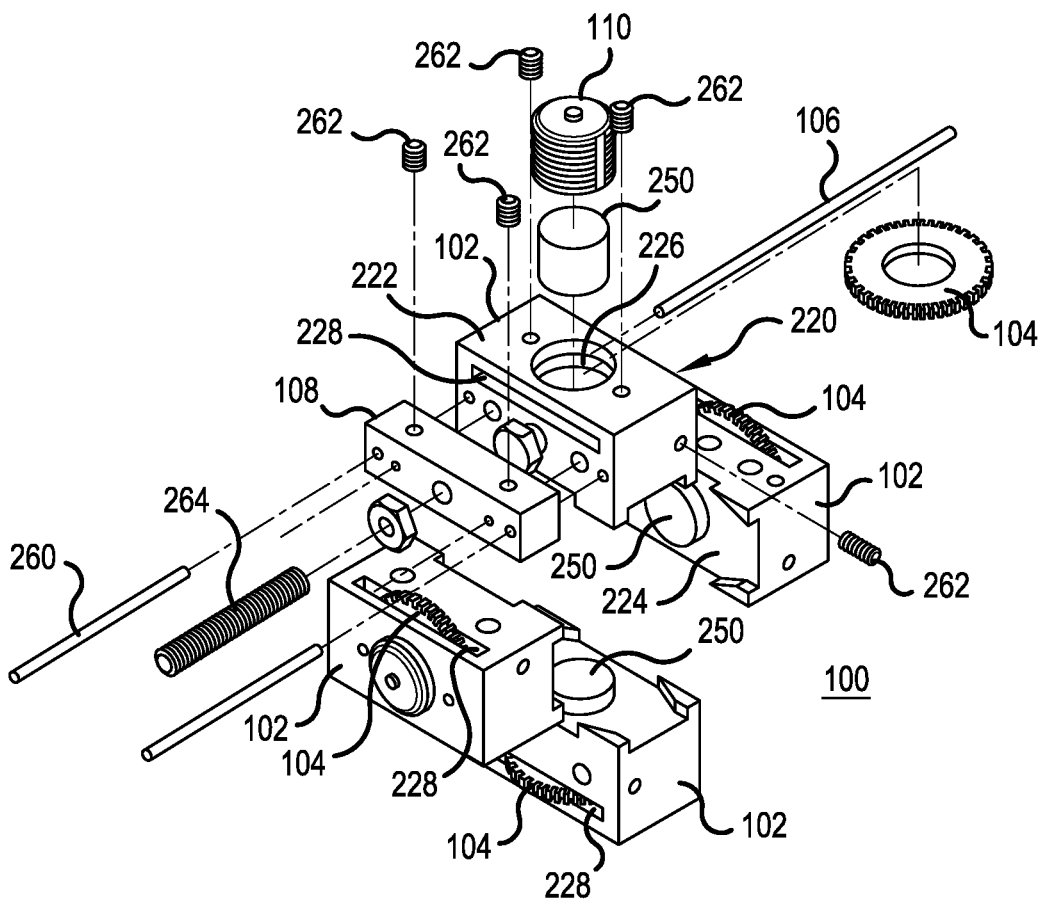
FIG. 2 is an exploded view of a transducer mounting apparatus.

Referring to FIG. 2, there is shown one of many possible embodiments of a transducer mounting apparatus 100. In a preferred embodiment, one or more transducer blocks 102 can be connected by a wire rope 106, cable, or other mechanical fastening means having the desired flexibility and strength characteristics. The transducer block 102 has a generally rectangular body 220 with a top surface 222 and a bottom surface 224, and can be made from a temperature tolerant thermoplastic polymer such as nylon, polyoxymethylene, acrylonitrile butadiene styrene (ABS), or nylon, examples of which are sold commercially under brand names such as PEEK™, DELRIN™, CELCON™, RAMTAL™, DURACON™, KEPITAL™, and HOSTAFORM™.

The top surface 222 of the body 220 can have an opening 226 adapted for receiving a transducer 110 and an ultrasonic testing (UT) couplant 250. A gear wheel 104 can be secured in a slot 228 in the body 220. The gear wheel 104 is used to adjust the transducer 110 pressure against the UT couplant 250 that is detachably positioned in the opening 226, thereby optimizing the positioning of the transducer 110 and couplant 250 relative to a pipe or other structure being monitored. Turning the gear wheel 104 adjusts the transducer 110, which optionally but preferably is threaded, up or down thereby adjusting the pressure on the couplant 250 to optimize the A-scan.

Figure 3:
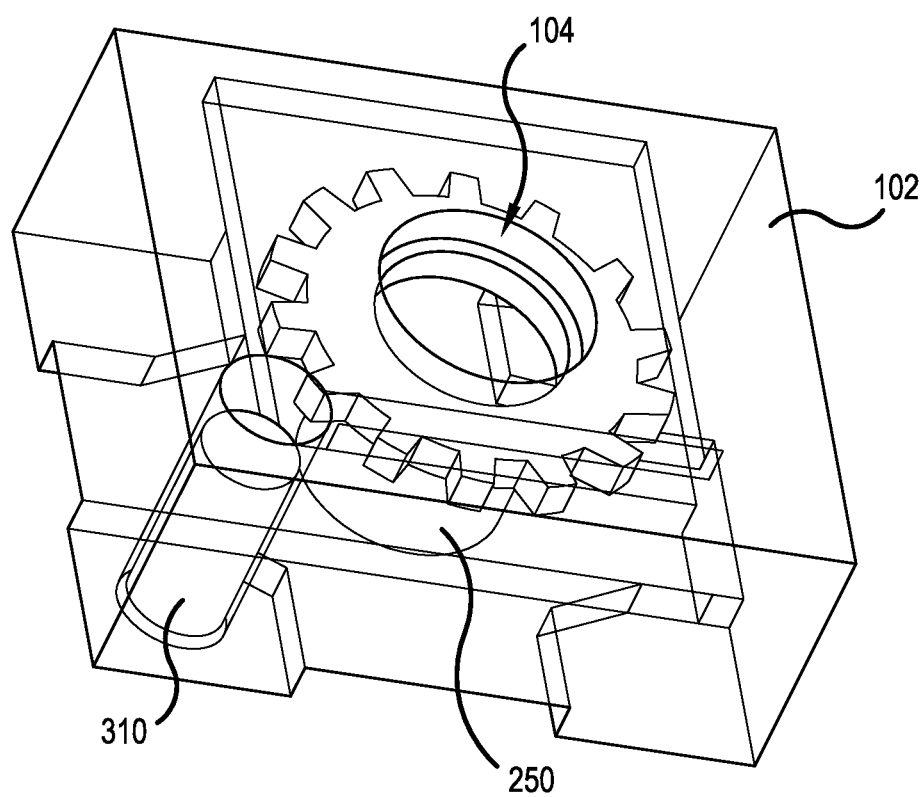
FIG. 3 is a is cutaway view of a transducer block.
Figure 4:
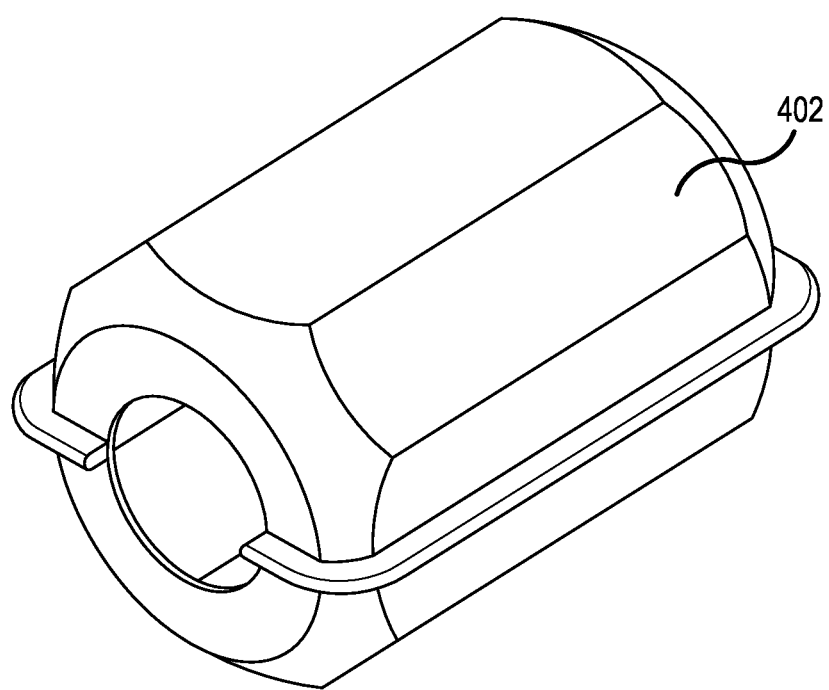
FIG. 4 is a perspective view of a transducer array shroud.

As shown in FIG. 3, the bottom surface of the transducer block 102 can have one more openings adapted for receiving one or more magnets 310. The magnets 310 help secure the transducer block 102 to a pipe or other structure being monitored. The magnet opening in the transducer block 102 optionally but preferably is a blind hole that keeps the magnets 310 from contacting the steel surface of the structure being monitored, which eliminates the potential for corrosion. Epoxy glue or set screws can be used to keep the magnets 310 in place. Different size magnets 310 can be used to increase the clamping force.

A tension block 108 can be positioned adjacent a transducer block 102 in a transducer mounting apparatus 100. The tension block 108 optionally but preferably is connected to a transducer block 108 by one or more wire ropes 106 and a large set screw 264. As shown most clearly in FIGS. 1 and 2, the wire ropes 106 extend through the tension block 108 and transducer blocks 102 to secure the transducer mounting apparatus 100 to a pipeline or other structure to be monitored. One or more dowel pins 260 can be used to align the tension block 108 to the transducer block 102. The dowel pins 260 optionally but preferably are stainless steel pins. One or more small set screws 262 can be used to lock the tension block 108 dowel pins 260 so that the dowel pins 260 remain stationary when the large set screw 264 is tightened to remove slack in the wire rope 106 that runs around the pipe through each mounting block 102. The mounting blocks 102 can be used to hold a transducer 110, or the mounting blocks 102 can be used as dummy mounts just to keep the wire rope 106 off the pipe. A transducer array shroud 402 can be positioned over the transducer mounting apparatus 100 and pipeline to further protect the apparatus 100 from inclement weather and the environment.

In operation, the transducer mounting apparatus 100 can be mounted to a pipeline or other structure to be monitored. One or more transducer blocks 102 are connected loosely by one or more wire ropes 106. The length of the wire rope 106 can be adjusted depending on the size and configuration of the pipe or other structure being monitored. Each transducer block has a rectangular body 220 having a top surface 222 and a bottom surface 224. A UT couplant 250 and threaded transducer 110 are positioned in an opening in the top surface 222 of the transducer block 102. A gear wheel 104 positioned in the body 220 of the transducer block 102 is used to adjust the transducer 110 up and down against the UT couplant 250, thereby optimizing the sensing capacity of the apparatus 100. One or more magnets 310 are secured in the bottom surface of the transducer blocks 102 to further secure the transducer blocks 102 to the pipe or other structure being monitored.

A tension block is 108 is positioned adjacent one of the transducer blocks 102 by extending a dowel pin 260 through aligned openings in the tension block 108 and transducer block 102. The dowel pin 260 holds the tension block 108 and transducer block 102 in position relative to one another until the wire rope 106 and large set screw 264 are secured. Once the apparatus 100 is placed loosely around a pipe or structure to be monitored, slack is removed from the wire rope 106 by adjusting the large set screw 264 extending from aligned openings in the tension block 108 and transducer block 102. The position of the transducer 110 and UT couplant 250 is then optimized using the gear wheel 104. A transducer shroud 402 can then be placed over the entire apparatus 100 and section of pipe being monitored to protect the apparatus 100 from the environment.

Once installed, the transducer mounting apparatus 100 can be monitored remotely. The apparatus 100 can include one or more transducers 110 for transmitting a conventional UT single frequency pulse or a broadband long pulse ultrasonic wave into a mechanical structure to be monitored and for receiving a response signal back from the mechanical structure, wherein the mechanical structure has a front face, a thickness, and a back wall. The apparatus 100 can also include additional environmental sensors, such as sensors for monitoring humidity, temperature, moisture, structural vibration, wind, atmospheric volatile organic compounds, or seismic activity. A central processing unit can be included either onsite in the apparatus 100 or at a remote site for eliminating noise from a response signal received back from a mechanical structure to be inspected. A means for transmitting the response signal to a remotely located server and for receiving data back from the remote serve can be included. Non-limiting examples of transmitting means include a wired or wireless connection to the Internet or other local area network with secure encrypted data transmission. Unlike prior ultrasound systems used for nondestructive testing which cannot be operated remotely due, at least in part, to their power requirements, the apparatus 100 of the present invention requires not more than about 12 volts of electrical force and can operate with as little as 5 volts of electrical force. This low power requirement allows the apparatus 100 to be wirelessly operated remotely. As a result, the apparatus 100 can be powered by the sun or a battery for extended periods of time. The apparatus 100 can further include auxiliary power means and/or a battery backup for powering the one or more transducers 110 and environmental sensors. The system can be an Internet-accessible system that allows the user to pulse a remotely located ultrasonic sensor that is permanently attached to a corroded pipe.

CONCLUSION

While various preferred embodiments have been shown and described, modifications thereof can be made by one skilled in the art without departing from the spirit and teachings herein. The embodiments herein are exemplary only, and are not limiting. Many variations and modifications of the apparatus disclosed herein are possible and within the scope of the invention. Accordingly, the scope of protection is not limited by the description set out above.

What is claimed is:

1. An apparatus, comprising: a transducer block having a top surface, a bottom surface, and side surfaces disposed to be perpendicular to the top and bottom surfaces of the transducer block, wherein the transducer block has an opening on its top surface and a slot arranged perpendicular to the opening, the slot having a slot opening on one of the side surfaces of the transducer block; and
    a gear wheel having an opening in a middle portion thereof, the gear wheel being secured in the slot and protruding from the slot opening of the transducer block, wherein a transducer is positioned in the opening of the gear wheel, and the gear wheel is configured to rotate to move the transducer vertically up or down relative to a solid ultrasonic (UT) couplant positioned in the transducer block.

2. The apparatus of claim 1, further wherein the transducer block comprises one or more openings in the bottom surface adapted for receiving a magnet.

3. The apparatus of claim 1, wherein the transducer is threaded.

4. A transducer mounting apparatus, comprising:
    one or more transducer blocks, each transducer block having an opening on its top surface and a slot arranged perpendicular to the opening, the slot having slot openings on opposing side surfaces of each of the transducer blocks, the side surfaces are disposed to be perpendicular to the top surface of each of the transducer blocks;
    a gear wheel having an opening in a middle portion thereof, the gear wheel being secured in the slot and protruding from the slot openings of each transducer block, wherein a transducer is positioned in the opening of the gear wheel, and the gear wheel is configured to rotate to move the transducer vertically up or down relative to a solid ultrasonic (UT) couplant positioned in each of the transducer blocks; and
    a tension block positioned adjacent to at least one of the opposing side surfaces and connected to the one or more transducer blocks by one or more wire ropes.

5. The transducer mounting apparatus of claim 4, further comprising a dowel pin for connecting the tension block to one or more of the transducer blocks.

6. The transducer mounting apparatus of claim 4, further comprising a magnet positioned in a hole in the transducer block for securing the transducer block to a metal surface.

7. The transducer mounting apparatus of claim 4, further comprising a set screw extending from the tension block to the transducer block, wherein the set screw adjusts the length of the one or more wire ropes.

8. The transducer mounting apparatus of claim 4, wherein the transducer is threaded.

9. The transducer mounting apparatus of claim 4, wherein the transducer can be activated and monitored remotely.

10. The transducer mounting apparatus of claim 4, further comprising a transducer array shroud positioned over the transducer mounting apparatus and section of pipe to which the transducer mounting apparatus is secured.

11. An apparatus, comprising:
    a transducer block having a top surface and a bottom surface, wherein the transducer block has an opening on its top surface and a slot arranged perpendicular to the opening, the slot having slot openings on opposing side surfaces of the transducer block, the side surfaces are disposed to be perpendicular to the top surface of each of the transducer blocks; and
    a gear wheel having an opening in a middle portion thereof, the gear wheel being secured in the slot and protruding from the slot openings of each transducer block, wherein a transducer is positioned in the opening of the gear wheel, and the gear wheel is configured to rotate to move the transducer vertically up or down relative to a solid ultrasonic (UT) couplant positioned in the transducer block.

\* \* \* \* \*